(12) United States Patent
Ikarashi

(10) Patent No.: US 10,509,630 B2
(45) Date of Patent: Dec. 17, 2019

(54) RANDOM NUMBER GENERATION APPARATUS, RANDOM NUMBER GENERATION METHOD AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/541,417

(22) PCT Filed: Jan. 13, 2016

(86) PCT No.: PCT/JP2016/050803
§ 371 (c)(1),
(2) Date: Jul. 3, 2017

(87) PCT Pub. No.: WO2016/114292
PCT Pub. Date: Jul. 21, 2016

(65) Prior Publication Data
US 2018/0011691 A1  Jan. 11, 2018

(30) Foreign Application Priority Data

Jan. 14, 2015 (JP) ................. 2015-004886

(51) Int. Cl.
*G06F 7/58* (2006.01)
*G09C 1/00* (2006.01)
*G06F 7/72* (2006.01)

(52) U.S. Cl.
CPC ............. *G06F 7/58* (2013.01); *G06F 7/584* (2013.01); *G06F 7/72* (2013.01); *G09C 1/00* (2013.01)

(58) Field of Classification Search
CPC ....................................... G06F 7/58
USPC ....................................... 708/250
See application file for complete search history.

(56) References Cited

U.S. PATENT DOCUMENTS

2011/0029588 A1* 2/2011 Ross ................ G06F 7/58
708/254

FOREIGN PATENT DOCUMENTS

JP  54-107640 A  8/1979
JP  2000-122851 A  4/2000

OTHER PUBLICATIONS

M. Matsumoto, Mersenne Twister: A 623-Dimensionally Equidistributed Uniform Pseudo-Random Number Generator, ACM Transactions on Modeling and Computer Simulation, vol. 8, No. 1, 1998, pp. 3-30 (Year: 1998).*

(Continued)

*Primary Examiner* — Andrew Caldwell
*Assistant Examiner* — Emily E Larocque
(74) *Attorney, Agent, or Firm* — Oblon, McClelland, Maier & Neustadt, L.L.P.

(57) ABSTRACT

A random number acquiring unit 15 obtains a first sequence that comprises values of digits of a random number represented by a binary number as elements. A logical product arithmetic unit 16 obtains a third sequence that is results of elementwise logical product operation between the first sequence and a second sequence that comprises values of digits of one or more Mersenne numbers represented by one or more binary numbers and a zero value as elements.

11 Claims, 3 Drawing Sheets

(56) References Cited

OTHER PUBLICATIONS

International Search Report dated Feb. 9, 2016, in PCT/JP2016/050803 filed Jan. 13, 2016.
Buchmann, "Introduction to Cryptography—Cryptographic Algorithm, Signature and Authentication, and Mathematical Foundation Thereof", Springer-Verlag, (Jul. 2001), p. 114 (submitting corresponding p. 124 of the English Version).
Extended European Search Report dated Jul. 12, 2018 in European Patent Application No. 16737363.8, 7 pages.
Office Action dated Oct. 14, 2019 in European Application No. 16737363.8 (Reference D2 cited in the Office Action is a partial English translation of Reference D1, which was previously cited in the present U.S. application on Jul. 27 2018).

* cited by examiner

Fig. 3A $$M = \underbrace{0 \cdots 0}_{\text{zero}} \underbrace{1111111}_{p_{N-1}} \underbrace{1111111}_{p_{N-2}} \cdots \underbrace{111111}_{p_0}$$

$$r = \underbrace{r_{N,z-1} \cdots r_{N,0}}_{r_N} \underbrace{r_{N-1,6} \cdots r_{N-1,0}}_{r_{N-1}} \underbrace{r_{N-2,6} \cdots r_{N-2,0}}_{r_{N-2}} \cdots \underbrace{r_{0,6} \cdots r_{0,0}}_{r_0}$$

$$t = \underbrace{0 \cdots 0}_{\text{zero}} \underbrace{t_{N-1,6} \cdots t_{N-1,0}}_{t_{N-1}} \underbrace{t_{N-2,6} \cdots t_{N-2,0}}_{t_{N-2}} \cdots \underbrace{t_{0,6} \cdots t_{0,0}}_{t_0}$$

Fig. 3B $$M = \underbrace{0}_{\text{zero}} \underbrace{1111111}_{p_{N-1}} \underbrace{0}_{\text{zero}} \underbrace{1111111}_{p_{N-2}} \cdots \underbrace{0}_{\text{zero}} \underbrace{1111111}_{p_0}$$

$$r = \underbrace{r_{N-1,7} \cdots r_{N-1,0}}_{r_{N-1}} \underbrace{r_{N-2,7} \cdots r_{N-2,0}}_{r_{N-2}} \cdots \underbrace{r_{0,7} \cdots r_{0,0}}_{r_0}$$

$$t = \underbrace{0}_{\text{zero}} \underbrace{t_{N-1,6} \cdots t_{N-1,0}}_{t_{N-1}} \underbrace{0}_{\text{zero}} \underbrace{t_{N-2,6} \cdots t_{N-2,0}}_{t_{N-2}} \cdots \underbrace{0}_{\text{zero}} \underbrace{t_{0,6} \cdots t_{0,0}}_{t_0}$$

Fig. 3C $$M = \underbrace{0 \cdots 0}_{\text{zero}} \underbrace{1111111}_{p_{N-1}} \underbrace{11111}_{p_{N-2}} \cdots \underbrace{1 \cdots 1}_{p_0}$$

$$r = \underbrace{r_{N,z-1} \cdots r_{N,0}}_{r_N} \underbrace{r_{N-1,6} \cdots r_{N-1,0}}_{r_{N-1}} \underbrace{r_{N-2,4} \cdots r_{N-2,0}}_{r_{N-2}} \cdots \underbrace{r_{0,12} \cdots r_{0,0}}_{r_0}$$

$$t = \underbrace{0 \cdots 0}_{\text{zero}} \underbrace{t_{N-1,6} \cdots t_{N-1,0}}_{t_{N-1}} \underbrace{t_{N-2,4} \cdots t_{N-2,0}}_{t_{N-2}} \cdots \underbrace{t_{0,12} \cdots t_{0,0}}_{t_0}$$

US 10,509,630 B2

RANDOM NUMBER GENERATION APPARATUS, RANDOM NUMBER GENERATION METHOD AND PROGRAM

TECHNICAL FIELD

The present invention relates to a random number generation technique, and in particular to a technique for generating a random number belonging to a predetermined set.

BACKGROUND ART

There is a random number generation method in which n random bits are generated, a decimal representation value "a" corresponding to a binary representation value with the n random bits as values of its digits is compared to "p−1" in magnitude, the process is performed again if a>p−1 is satisfied, and, otherwise, "a" is adopted as a random number (see, for example, Non-patent literature 1). When "p" is a prime number, a random number on a prime field can be generated.

PRIOR ART LITERATURE

Non-Patent Literature

Non-patent literature 1: Buchmann, Johannes A., "Introduction to Cryptography—Cryptographic Algorithm, Signature and Authentication, and Mathematical Foundation Thereof", Springer-Verlag, July 2001, P 114.

SUMMARY OF THE INVENTION

Problems to be Solved by the Invention

In the method described above, when the number of elements of p represented by a binary number is small for n, the random number generation probability extremely decreases, and the random number generation speed decreases.

A theme of the present invention is to generate a random number belonging to a predetermined set at a high speed.

Means to Solve the Problems

A first sequence that comprises values of digits of a random number represented by a binary number as elements is obtained, and a third sequence is obtained which is results of elementwise logical product operation between the first sequence and a second sequence that comprises values of digits of one or more Mersenne numbers represented by one or more binary numbers and a zero value as elements.

Effects of the Invention

Thereby, it is possible to generate a random number belonging to a predetermined set at a high speed.

BRIEF DESCRIPTION OF THE DRAWINGS

FIGS. 3A to 3C are diagrams illustrating first to third sequences of the embodiments.

DETAILED DESCRIPTION OF THE EMBODIMENTS

Figure 1:
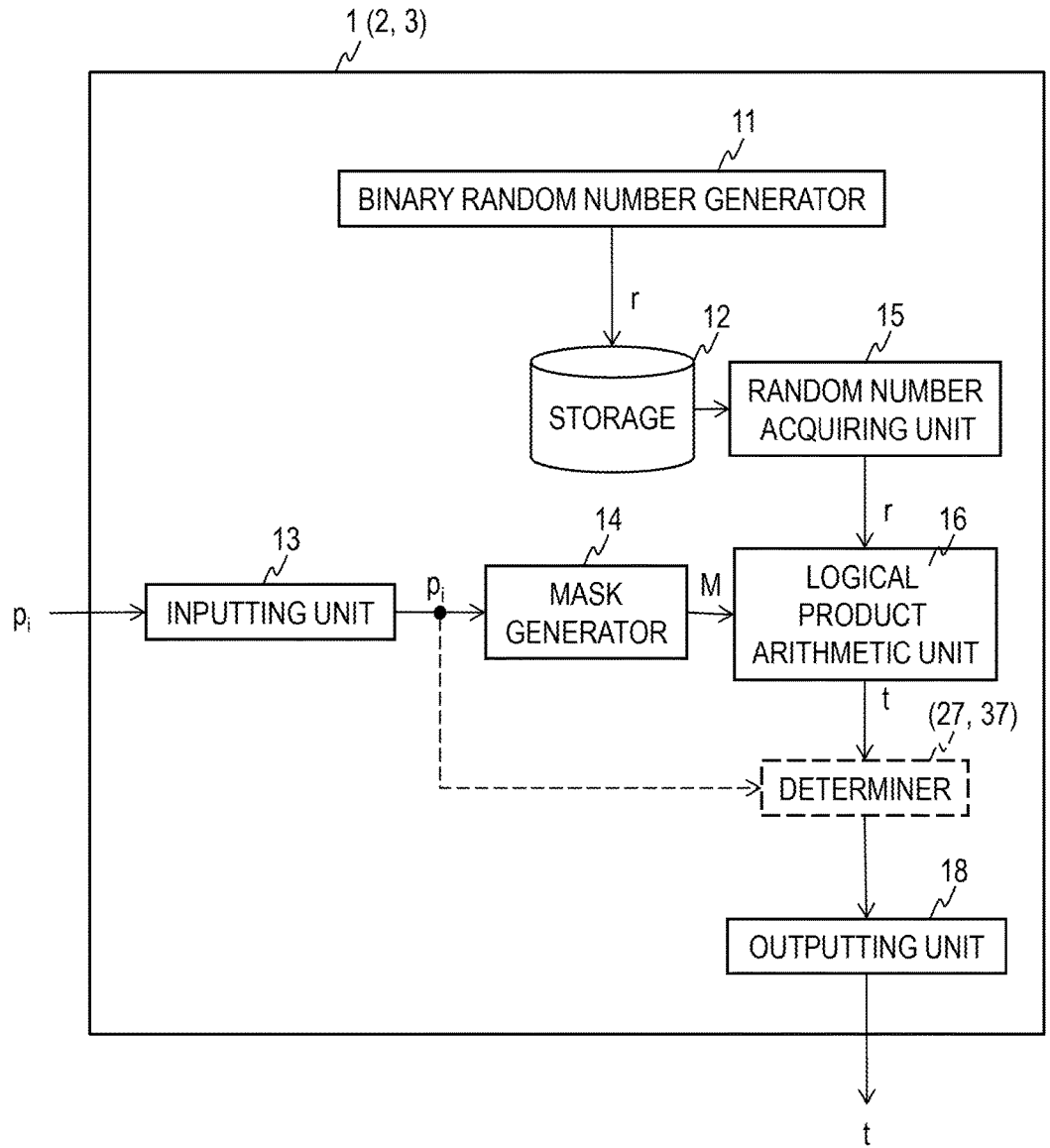
FIG. 1 is a block diagram illustrating a functional configuration of a random generation apparatus of embodiments.

Embodiments of the present invention will be described below.

<Outline>

In the embodiments, a random number belonging to a predetermined set is generated as described below. First, a "first sequence" which comprises values of digits of a random number represented by a binary number (a binary random number) as elements is obtained (a random number acquiring step). This random number may be a uniform random number or may not be a uniform random number. The concept of a "random number" includes a genuine random number and a pseudo-random number. The random number may be generated in advance or may be generated when the "first sequence" is obtained. The "first sequence" may comprise only the values of the digits of the random number represented by a binary number as elements or may furthermore comprise other elements. Next, a "third sequence", which is results of elementwise logical product operation (elementwise AND operation results, for example, bit AND operation results) between the "first sequence" and a "second sequence, is obtained (a logical product operation step). Here, the "second sequence" is a sequence which comprises values of digits of one or more Mersenne numbers $p_i$ (i=0, . . . , N−1; N is an integer of 1 or more) represented by one or more binary numbers, and zero values as elements. The number of elements of the "second sequence" is, for example, the same as the number of elements of the "first sequence". The "second sequence" may comprise only the values of the digits of the Mersenne number(s) $p_i$ and the zero values as the elements or may furthermore comprise other elements (for example, a fixed value, attribute information and the like). The Mersenne number $p_i$ is an integer which satisfies $2^{n(i)}-1$, and the Mersenne number $p_i$ represented by a binary number is a sequence 1 . . . 1 which is constituted by n(i) 1's. Here, n(i) is a particular positive integer. An example of $p_i$ is a Mersenne prime. For example, at the time of n(i)=2, 3, 5, 7, 13, 17, 19, 31, 61 or the like, $p_i$ is a Mersenne prime. The "third sequence" is a sequence obtained by masking the "first sequence" with the "second sequence" and is a sequence which comprises a random number $t_i$ with n(i) digits represented by a binary number. The random number $t_i$ can be treated as a random number on a factor ring (a residue class) modulo the Mersenne number $p_i$. Especially, when $p_i$ is a Mersenne prime, the random number $t_i$ can be treated as a random number on a residue field (a prime field) modulo the Mersenne number $p_i$. On the factor ring modulo the Mersenne number $p_i$, $p_i$, $p_i=2^{n(i)}-1$ and 0 are the same value ($2^{n(i)}-1$ mod($2^{n(i)}-1$)=0), and N random numbers $t_i$ (i=0, . . . , N−1) comprised in the "third sequence" can be "necessarily" treated as random numbers on the factor ring modulo the Mersenne number $p_i$. Therefore, it is possible to generate a random number on a factor ring at a higher speed in comparison with prior arts in which the random number generation probability decreases depending on an environment.

However, since $p_i$ and 0 are treated as the same value on the factor ring modulo $p_i$ (0 is an equivalence class of $p_i$), the random number $t_i$ is not necessarily a uniform random number. That is, when the random number represented by the "first sequence" is a uniform random number, each of the probabilities of $t_i$ being 0, 1, . . . , $p_i$ is $\frac{1}{2}^{n(i)}$, and the probability of $t_i$ being $p_i$ or 0 is $\frac{1}{2}^{n(i)-1}$. Therefore, on the factor ring described above, the generation probability of 0 (in other words, the generation probability of $p_i$) is $\frac{1}{2}^{n(i)-1}$, and the generation probabilities of other random numbers are $\frac{1}{2}^{n(i)}$. In order to obtain a uniform random number on the factor ring, it is only necessary to discard a generated random number and perform the random number acquiring step and the logical product operation step again when $t_i=p_i$ is satisfied. In other words, the processes of the random number acquiring step and the logical product operation step can be executed again when the "first sequence" comprises a "first subsequence", a "second subsequence" comprised in the "second sequence" indicates any Mersenne number Pi, the "third sequence" comprises a "third subsequence" which is results of elementwise logical product operation between the "first subsequence" and the "second subsequence", and the "second subsequence" matches the "third subsequence". In such a configuration also, the probability of $t_i=p_i$ being satisfied (the probability of the "second subsequence" and the "third subsequence" matching each other) is only about $\frac{1}{2}^{n(i)-1}$, and it is possible to generate a uniform random number on a factor ring at a high speed.

Otherwise, the random number acquiring step and the logical product operation step may be performed again when $t_i=0$ is satisfied. In other words, the processes of the random number acquiring step and the logical product operation step may be executed again when elements of the "third subsequence" are constituted by zeros (when the "third subsequence" is a zero vector). Thereby, it is also possible to generate a uniform random number on a factor ring at a high speed.

Further, when it is assumed that N is an integer of 2 or more and that the "second sequence" is a sequence which comprises values of digits of a plurality of Mersenne numbers $p_i$ represented by binary numbers, and zero values as elements, a plurality of random numbers on factor rings can be generated by parallel processes, and random number generation at a higher speed becomes possible. The numbers of digits (bit lengths) n(i) of the Mersenne numbers $p_i$ represented by binary numbers may be mutually the same or may not be the same.

In the case of generating uniform random numbers on a factor ring by such parallel processes, it is possible to (1) simultaneously determine whether $t_i=p_i$ is satisfied or not for i=0, . . . , N−1 by a batch equality determination, (2) obtain an aggregate determination result x indicating, for any i, whether $t=p_i$ is satisfied or not by a sum operation or a product operation of the equality determination results $x_i$ (i=0, . . . , N−1), and (3) perform the random number acquiring step and the logical product operation step again when the aggregate determination result x indicates, for any i, that $t_i=p_i$ is satisfied. In other words, (1) each of the equality determination results $x_i$ (i=0, . . . , N−1) indicating whether or not a plurality of "second subsequences" match a plurality of "third subsequences", respectively, is obtained by the batch determination of equality, (2) an aggregate determination result x indicating whether any "second subsequence" and "third subsequence" match each other or not is obtained by a sum operation or a product operation of the plurality of equality determination results $x_i$, and (3) when the aggregate determination result x indicates that any "second subsequence" and "third subsequence" match each other, the random number acquiring step and the logical product operation step may be executed again. Here, the "first sequence" comprises a plurality of "first subsequences"; the plurality of "second subsequences" comprised in the "second sequence" indicate values of digits of the respective Mersenne numbers $p_i$; the "third sequence" comprises the plurality of "third subsequences"; and the plurality of "third subsequences" are results $t_i$ of elementwise logical product operation between the respective "first subsequences" and the respective "second subsequences". Here, the operation amounts of the batch determination of equality, the sum operation and the production operation are small. Further, as described above, the probability of $t_i=p_i$ being satisfied is about $\frac{1}{2}^{n(i)-1}$, and the probability of $t_i=p_i$ being satisfied for any i is low. Therefore, it is possible to generate a uniform random number on a factor ring at a higher speed.

Otherwise, (4) determinations about whether $t_i=0$ is satisfied or not are simultaneously performed for i=0, . . . , N−1 by a batch determination of equality, (5) an aggregate determination result x indicating, for any i, whether $t_i=0$ is satisfied or not is obtained by a sum operation or a product operation of equality determination results $x_i$ (i=0, . . . , N−1) of the batch determination of equality, and (6) when the aggregate equality determination result x indicates that $t_i=0$ is satisfied for any i, the random number acquiring step and the logical product operation step may performed again. In other words, (4) each of the plurality of equality determination results $x_i$ (i=0, . . . , N−1) indicating whether elements of each of the plurality of "third subsequences" are constituted by zeros or not is obtained by the batch determination of equality, (5) the aggregate determination result x indicating whether elements of any "third subsequence" are constituted by zeros or not is obtained by a sum operation or a product operation of the plurality of the equality determination results $x_i$, and (6) when the aggregate determination result x indicates that elements of any "third subsequence" are constituted by zeros, the processes of the random number acquiring step and the logical product operation step may be executed again. In this case also, it is possible to generate a uniform random number on a factor ring at a high speed.

[First Embodiment]

Next, a first embodiment will be described. In the present embodiment, description will be made on a case where $p_i$ is a Mersenne prime.

<Configuration>

As illustrated in FIG. 1, a random number generation apparatus 1 of the present embodiment has a binary random number generator 11, storage 12, an inputting unit 13, a mask generator 14, a random number acquiring unit 15, a logical product arithmetic unit 16 and an outputting unit 18. The random number generation apparatus 1 is, for example, an apparatus configured by a general-purpose or dedicated computer provided with a processor (a hardware processor) such as a CPU (central processing unit), memories such as a RAM (random-access memory) and a ROM (read-only memory), and the like executing a predetermined program. The computer may be provided with one processor and one memory or may be provided with a plurality of processors and a plurality of memories. The program may be installed in the computer or may be recorded in the ROM or the like in advance. Further, a part or all of the processing units may be configured with the use of an electronic circuit (a circuitry) which realizes processing functions without using a program, instead of an electronic circuit which realizes a functional configuration by a program being read like a CPU. Further, the electronic circuit constituting one apparatus may comprise a plurality of CPUs.

<Process>

In the present embodiment, each of the "first sequence", "second sequence" and "third sequence" is treated as a vector constituted by L elements, and it is assumed that the random number generation apparatus 1 performs an operation with n-bit precision. Here, L is a positive integer larger than the total number of elements $n(0)+ \ldots +n(N-1)$ of Mersenne primes $p_0, \ldots, p_{N-1}$ represented by binary numbers. Here, L may be a constant or may be specified according to inputted Mersenne primes $p_0, \ldots, p_{N-1}$. When an assumed magnitude of the Mersenne primes $p_0, \ldots, p_{N-1}$ is specified in advance, L can be a constant.

Figure 2A:
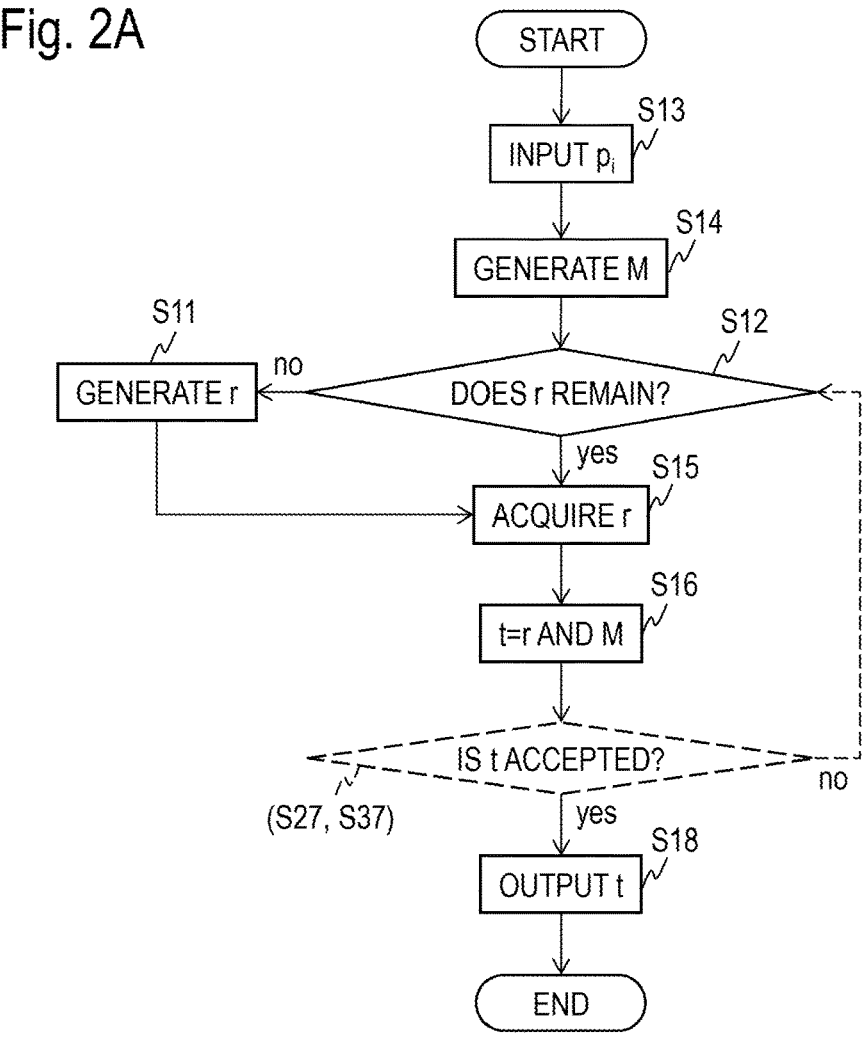
FIG. 2A is a flow diagram illustrating a random number generation method of the embodiments.

As illustrated in FIG. 2A, information identifying Mersenne primes $p_0, \ldots, p_{N-1}$ is inputted to the inputting unit 13 first. An example of this information is the Mersenne primes $p_0, \ldots, p_{N-1}$ themselves, $n(0), \ldots, n(N-1)$ or the like. The information identifying the Mersenne primes $p_0, \ldots, p_{N-1}$, is sent to the mask generator 14 (step S13).

The mask generator 14 obtains and outputs a vector $M \in \{0,1\}^L$ (the second sequence), the vector M being constituted by L elements including values of digits of the Mersenne primes $p_0, \ldots, p_{N-1}$ represented by binary numbers and a zero value (zero values). FIGS. 3A to 3C show specific examples of the vector M. The example of FIG. 3A is an example of $n(0)= \ldots =n(N-1)=7$. In the vector M of this example, the top z elements ($z=L-(n(0)+ \ldots +n(N-1))$) are 0, and all the remaining elements are 1. In other words, following the top subsequence zero constituted by z 0's, the Mersenne primes $p_{N-1}, \ldots, p_0$ represented by binary numbers are arranged. The example of FIG. 3B is also an example of $n(0)= \ldots =n(N-1)=7$. In this example, however, one Mersenne prime $p_i$ ($i=N-1, \ldots, 0$) represented by a binary number is arranged following one element zero of 0, and 0's and Mersenne primes $p_i$ represented by binary numbers are alternately arranged. In FIG. 3C, following the top subsequence zero constituted by z 0's, the Mersenne primes $p_{N-1}, \ldots, p_0$ represented by binary numbers are arranged. Here, all the Mersenne $p_{N-1}, \ldots, p_0$ are not the same. Likewise, in the example of FIG. 3B, all the Mersenne $p_{N-1}, \ldots, p_0$ may not be the same. The generated vector M is sent to the logical product arithmetic unit 16 (step S14).

The random number acquiring unit 15 determines whether a binary random number vector $r \in \{0,1\}^L$ (the first sequence) remains in the storage 12, the binary random number vector r being an L-bit binary random number vector constituted by L elements (step S12). If the binary random number vector r remains, the random number acquiring unit 15 reads the binary random number vector r from the storage 12 and outputs it (step S15). The read binary random number vector r is deleted from the storage 12. On the other hand, if the binary random number vector r does not remain, the binary random number generator 11 generates an L-bit binary random number vector $r \in \{0, 1\}^L$ and stores it into the storage 12, and the random number acquiring unit 15 reads the binary random number vector r from the storage 12 and outputs it (step S15). It is desirable that the binary random number generator 11 generates a plurality of binary random number vectors r by parallel processes and stores them into the storage 12 to speed up processing. The outputted binary random number vectors r are sent to the logical product arithmetic unit 16.

The logical product arithmetic unit 16 performs element-wise logical product operations (bit AND operations) between the binary random number vector r and the vector M to obtain and output a vector $t \in \{0,1\}^L$ (the third sequence) which is a result of the operation. When the j-th element of the vector M ($j=0, \ldots, L-1$) is 0, the j-th element of the vector t is 0. When the j-th element of the vector M is 1, the j-th element of the vector t is the j-th element of the binary random number vector r. That is, the vector t is a vector obtained by masking the binary random number vector r with the vector M. An element sequence (a subsequence) of the vector t corresponding to an element sequence of a Mersenne prime $p_i$ represented by a binary number, which is comprised in the vector M, is represented by a subsequence $t_i$. For example, when the Mersenne prime $p_i$ represented by a binary number is an element sequence of the $j_1$-th element to the $j_2$-th element of the vector M, the subsequence $t_i$ is an element sequence of the $j_1$-th element to the $j_2$-th element of the vector $t_i$. For example, in the case of the example of FIG. 3A, the top z elements of the binary random number vector r is a subsequence $r_N$ constituted by $(r_{N,z-1}, \ldots, r_{N,0}) \in \{0,1\}^z$. However, since all the top z elements of the vector M are 0, all the top z elements of the vector t are also 0. Since all the subsequent elements of the vector M are 1, the subsequent subsequences $t_{N-1}, \ldots, t_0$ ($t_i$ is a subsequence constituted by $t_{i,6}, \ldots, t_{i,0} \in \{0,1\}^7$) of the vector t are subsequences $r_{N-1}, \ldots, r_0$ (r is a subsequence constituted by $r_{i,6}, \ldots, r_{i,0} \in \{0,1\}^7$) of the binary random number vector r. For example, in the case of the example of FIG. 3B, the binary random number vector r is constituted by subsequences $r_{N-1}, \ldots, r_0$ ($r_i$ is a subsequence constituted by $r_{i,7}, \ldots, r_{i,0} \in \{0,1\}^7$). Since the vector M has N subsequences of 01111111 constituted by 0 and 1111111, the subsequences $t_{N-1}, \ldots, t_0$ ($t_i$ is a subsequence constituted by $t_{i,6}, \ldots, t_{i,0} \in \{0,1\}^7$) of the vector t are the subsequences $r_{N-1}, \ldots, r_0$ ($r_i$ is a subsequence constituted by $r_{i,6}, \ldots, r_{i,0} \in \{0,1\}^7$) of the binary random number vector r. For example, in the example of FIG. 3C, all the top z elements of the vector M are 0, and all the remaining elements are 1. Therefore, all the top z elements of the vector t are 0, and the subsequent subsequences $t_{N-1}, \ldots, t_0$ are the subsequences $r_{N-1}, \ldots, r_0$ of the binary random number vector r. The obtained vector t is sent to the outputting unit 18 (step S16).

The outputting unit 18 may output the vector t as it is or may output only the subsequences $t_{N-1}, \ldots, t_0$ comprised in the vector t. Each subsequence $t_i$ ($i=0, \ldots, N-1$) is treated as a random number on a residue field (a prime field) modulo the Mersenne prime $p_i$ (step S18). If a random number on the prime field is further required, the process from steps S13 to S18 or the process of S11 to S18 can be repeated.

<Characteristics of the Present Embodiment>

In the case of generating a random number on a prime field by a magnitude comparison between values represented by a binary random number vector r and a prime number p as done conventionally, if the number of elements of p represented by a binary number is small for the number of elements L of the binary random number vector r, the probability of random number generation on the prime field extremely decreases, and the random number generation speed decreases. For example, when the binary random number vector r indicates a uniform random number, and the number of elements of p represented by a binary number is L-1, the probability of random number generation on the prime field is 50% when p is a Mersenne prime and is below 50% when p is a prime number other than a Mersenne prime. This success probability decreases more when parallel processes are performed. For example, if it is attempted to generate 1000 prime numbers in parallel when the success probability is about 50%, the failure probability is about 99.9%, and the performance extremely decreases with only little success.

In comparison, since it is possible to certainly generate a random number on a prime field in the present embodiment, it is possible to generate a random number on a prime field at a high speed. Furthermore, the success probability does not decrease even if random number generation is performed by performing elementwise logical production operations (N≥2) simultaneously in parallel. Therefore, random numbers on prime fields can be generated at a higher speed by such parallel processes. Further, a lot of computers can perform bit AND operations (elementwise logical product operations) in parallel at a high speed and can efficiently implement the method of the present embodiment. Furthermore, the bit AND operation of the present embodiment can be executed by an L-bit register and can reduce the storage capacity in comparison with a method performing magnitude comparison such as a conventional one.

[Second Embodiment]

In the present embodiment, a uniform random number on a prime field is generated. Description will be made below mainly on points different from the matters described so far. As for the matters already described, the same reference numerals for the matters will be used, and description thereof will be omitted.

<Configuration>

As illustrated in FIG. 1, a random number generation apparatus 2 of the present embodiment has a binary random number generator 11, storage 12, an inputting unit 13, a mask generator 14, a random number acquiring unit 15, a logical product arithmetic unit 16, a determiner 27 and an outputting unit 18. The random number generation apparatus 2 may be configured, for example, by a predetermined program being read into the computer described above, or at least a part of components of the random number generation apparatus 2 may be configured only by hardware.

<Process>

The process of steps S11 to S16 is the same as that of the first embodiment. In the second embodiment, however, the Mersenne primes $p_i$ inputted to the inputting unit 13 and the vector t obtained at step S16 are inputted to the determiner 27. The determiner 27 determines whether any subsequence $t_i$ comprised in the vector t matches the Mersenne prime $p_i$ (i=0, . . . , N−1) (an equality determination) (step S27). If $t_i=p_i$ is satisfied for any of i=0, . . . , N−1, the determiner 27 discards the vector t (t is rejected) and returns the process to step S12. On the other hand, $t_i \neq p_i$ is satisfied for all of i= 0, . . . , N−1, the vector t is outputted to the outputting unit 18 (t is accepted). The subsequent process is the same as that of the first embodiment.

Figure 2B:
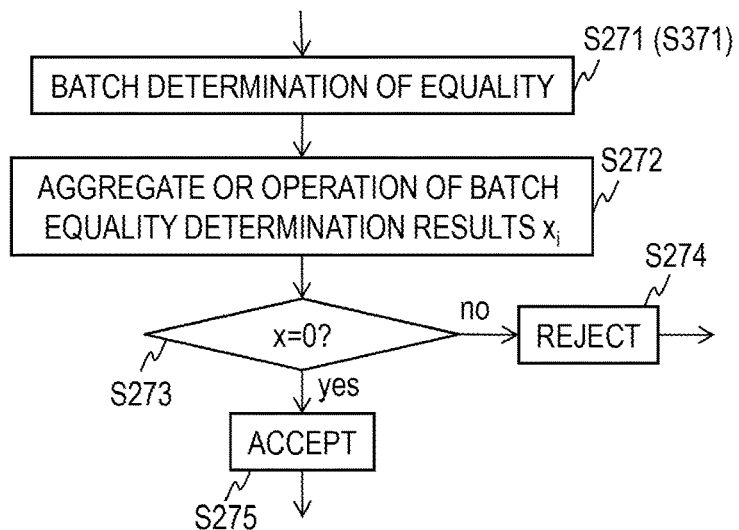
FIG. 2B is a flow diagram illustrating an equality determination process.

Though the determination of equality at step S27 may be performed independently for each i, batch processing may be performed as illustrated in FIG. 2B. In the example of FIG. 2B, a batch equality determiner of the determiner 27 simultaneously determines whether $t_i=p_i$ is satisfied or not for all of i=0, . . . , N−1 (a batch determination of equality) to obtain a sequence of equality determination results $x_i$. Here, $x_i=2^k-1$ is satisfied in the case of $t_i=p_i$, and $x_i=0$ is satisfied in the case of $t_i \neq p_i$; and k is a positive integer and satisfies 0<k×N≤L (step S271). Next, an aggregate arithmetic unit of the determiner 27 performs an aggregate OR operation (a sum operation) of the equality determination results $x_i$ (i=0, . . . , N−1) to obtain an aggregate determination result x which is a result of the operation. Here, when any equality determination result $x_i$ (i=0, . . . , N−1) is $2^k-1$ (when any equality determination result $x_i$ is not 0), $x=2^k-1$ is satisfied; and, when all the equality determination results $x_i$ (i=0, . . . , N−1) are 0, x=0 is satisfied. Here, k' is a positive integer and satisfies 0<k'≤L. Here, k=k' may be satisfied, or k≠k' may be satisfied (step S272). After that, the aggregate determiner of the determiner 27 determines whether x=−0 is satisfied or not (step S273). Here, if $x=2^k-1$ is satisfied, the aggregate determiner discards the vector t (t is rejected) (step S274) and returns the process to step S12. On the other hand, if x=0 is satisfied, the aggregate determiner sends the vector t to the outputting unit 18 (t is accepted) (step S275).

In addition, the batch equality determiner may set $x_i=0$ when $t_i=p_i$ is satisfied and set $x_i=2^k-1$ when $t_i \neq p_i$ is satisfied, and the aggregate arithmetic unit may perform an aggregate AND operation (a product operation) of $x_i$ (i=0, . . . , N−1) to obtain an aggregate determination result x which is a result of the operation. Here, when any equality determination result $x_i$ (i=0, . . . , N−1) is 0, x=0 is satisfied; and, when all the equality determination results $x_i$ (i=0, . . . , N−1) are $2^k-1$, $x=2^k-1$ is satisfied. In this case, if x=0 is satisfied, the aggregate determiner discards the vector t (t is rejected) and returns the process to step S12. On the other hand, if $x=2^k-1$ is satisfied, the aggregate determiner sends the vector t to the outputting unit 18 (t is accepted).

<Characteristics of the Present Embodiment>

As described before, if the binary random number vector r indicates a uniform random number, each subsequence $t_i$ is a uniform random number on a residue field (a prime field) modulo the Mersenne prime $p_i$. The probability of $t_i=p_i$ being satisfied is about $\frac{1}{2}^{n(i)-1}$, and the probability of success is high irrespective of the magnitude of L. Since random number generation almost certainly succeeds in the present embodiment also, the success probability does not decrease almost at all even if the determination of equality for the subsequence $t_i$ (i=0, . . . , N−1) are simultaneously performed in parallel, and the probability of rejection at step S27 is low. For example, when $p=2^{61}-1$ (that is, n(i)=61) is satisfied, the probability of failure in simultaneous generation in parallel of 1000 is $\frac{1}{2}^{51}$ which is sufficiently low, and overhead of redoing is extremely small. Therefore, by performing batch processing of the equality determination of step S27 as described above, it is possible to obtain a uniform random number on a prime field at a higher speed. That is, operation cost of the batch determination of equality and aggregate OR operation (or aggregate AND operation) described above is low. For example, in the case of L=256, a lot of computers can perform the processes in 1 clock. Further, a lot of current computers are provided with a branch prediction function and starts processing with a branch having more actual results, prior to performing branch calculation. Therefore, when the probability of redoing is low, the number of clocks required for conditional branch is substantially zero. Further, since the Mersenne primes $p_0, \ldots, p_{N-1}$ comprised in the vector M∈$\{0,1\}^L$, which is a mask, are identical with criteria for determination of equality, a register in which the vector M has been stored for a mask process can be used for the process of determination of equality also, and the processes can be realized with a small number of registers. Further, there is also an advantage that the determination of equality is more efficient in comparison with the magnitude comparison used in conventional systems (for the number of bits n, a circuit scale O(n)/depth O(n) or a circuit scale O(n log n)/depth O(log n) in the case of the magnitude comparison but a circuit scale O(n)/depth O(log n) in the case of the determination of equality).

[Third Embodiment]

In the present embodiment also, a uniform random number on a prime field is generated. Description will be made below mainly on points different from the matters described so far. As for the matters already described, the same reference numerals for the matters will be used, and description thereof will be omitted.

<Configuration>

As illustrated in FIG. 1, a random number generation apparatus 3 of the present embodiment has a binary random number generator 11, storage 12, an inputting unit 13, a mask generator 14, a random number acquiring unit 15, a logical product arithmetic unit 16, a determiner 37 and an outputting unit 18. The random number generation apparatus 3 may be configured, for example, by a predetermined program being read into the computer described above, or at least a part of components of the random number generation apparatus 3 may be configured only by hardware.

<Process>

The process of steps S11 to S16 is the same as that of the first embodiment. In the third embodiment, however, the vector t obtained at step S16 is inputted to the determiner 37. The determiner 37 determines whether any subsequence $t_i$ comprised in the vector t is a zero vector ($t_i=0$) or not (step S37). If $t_i=0$ is satisfied for any of i=0, ..., N−1, the determiner 37 discards the vector t (t is rejected) and returns the process to step S12. On the other hand, $t_i\neq 0$ is satisfied for all of i=0, ..., N−1, the vector t is outputted to the outputting unit 18 (t is accepted). The subsequent process is the same as that of the first embodiment.

Similarly to the second embodiment, though the determination of equality at step S37 may be independently performed for each i, batch processing may be performed as illustrated in FIG. 2B. In the example of FIG. 2B, a batch equality determiner of the determiner 37 simultaneously determines whether $t_i=0$ is satisfied or not for all of i= 0, ..., N−1 (a batch determination of equality) to obtain a sequence of equality determination results $x_i$. Here, $x_i=2^k-1$ is satisfied in the case of $t_i=0$, and $x_i=0$ is satisfied in the case of $t_i\neq 0$ (step S371). The subsequent steps S272 to S275 are the same as those of the second embodiment.

In addition, the batch equality determiner may set $x_i=0$ when $t_i=0$ is satisfied and set $x_i=2^k-1$ when $t_i\neq 0$ is satisfied, and the aggregate arithmetic unit may perform an aggregate AND operation (a product operation) of $x_i$ (i=00, ..., N−1) to obtain an aggregate determination result x which is a result of the operation. However, when any equality determination result $x_i$ (i=00, ..., N−1) is 0, x=0 is satisfied; and, when all the equality determination results $x_i$ (i=0, ..., N−1) are $2^k-1$, $x=2^k-1$ is satisfied. In this case, if x=0 is satisfied, the aggregate determiner discards the vector t (t is rejected) and returns the process to step S12. On the other hand, if $x=2^k-1$ is satisfied, the aggregate determiner sends the vector t to the outputting unit 18 (t is accepted).

<Characteristics of the Present Embodiment>

In the present embodiment also, it is possible to generate a uniform random number on a prime field at a high speed similarly to the second embodiment.

[Other Modifications and the Like]

The present invention is not limited to the embodiments described above. For example, the Mersenne primes $p_i$ may be set in a random number generation apparatus in advance. In this case, step S13 and the inputting unit 13 can be omitted. Furthermore, the vector M may be set in the random number generation apparatus in advance. In this case, step S14 and the mask generator 14 can be furthermore omitted. Further, the binary random number vector r may be stored in the storage 12 in advance. Further, Mersenne numbers which are composite numbers may be used instead of Mersenne primes. For example, all of the Mersenne numbers $p_0, \ldots, p_{N-1}$ may be composite numbers or the Mersenne numbers $p_0, \ldots, p_{N-1}$ may comprise prime numbers and composite numbers.

The various processes described above are not only executed in order of the description. They may be executed in parallel or individually according to processing capacity of an apparatus to execute the processes or as necessary. In addition, it goes without saying that the various processes can be appropriately changed within a range not departing from the spirit of the present invention.

In the case of realizing the configuration described above by a computer, processing content of a function which each apparatus should have is written in a program. By executing the program on the computer, the processing functions described above are realized on the computer. The program in which the processing content is written can be recorded in a computer-readable recording medium. An example of the computer-readable recording medium is a non-transitory recording medium. Examples of such a recording medium are a magnetic recording device, an optical disk, a magneto-optical recording medium, a semiconductor memory and the like.

Distribution of this program is performed, for example, by sales, transfer, lending and the like of a portable recording medium such as a DVD and a CD-ROM in which the program is recorded. Furthermore, a configuration is also possible in which the program is stored in a storage device of a server computer to distribute the program by transferring the program from the server computer to other computers via a network.

For example, a computer which executes such a program stores the program recorded in the portable recording medium or transferred from the server computer into its storage device once. At the time of executing a process, the computer reads the program stored in its recording device and executes a process in accordance with the read program. As another form of executing this program, it is also possible for the computer to read the program directly from the portable recording medium and execute the process in accordance with the program, and, furthermore, it is also possible for the computer to, each time a program is transferred to the computer from the server computer, execute a process in accordance with the received program in order. A configuration is also possible in which the program is not transferred from the server computer to the computer is not performed, but the processes described above are executed by a so-called ASP (Application Service Provider) type service for realizing a processing function only by an instruction to execute the program and acquisition of a result.

Although the processing functions of the present apparatus are realized by causing a predetermined program to be executed on a computer in the above embodiment, at least a part of the processing functions may be realized by hardware.

INDUSTRIAL APPLICABILITY

The present invention can be used for various cryptography techniques, for example, secret sharing, secret calculation, public key cryptography, symmetric key cryptography, digital signature and the like.

DESCRIPTION OF REFERENCE NUMERALS 1-3: random number generation apparatus

What is claimed is:

1. A random number generation apparatus for generating a random number on a factor ring which is used for electronic cryptography system, the random number generation apparatus comprises a processing circuitry and a memory that stores a program, and when the processing circuitry executes the program, the processing circuitry is configured to implement:

a storage;

a binary random number generating unit generating a first sequence that comprises values of digits of a uniform random number represented by a binary number as elements and stores the first sequence in the storage;

a random number acquiring unit obtaining, from the storage, the first sequence;

a mask generator receiving an input of Mersenne prime numbers and generating a second sequence that comprises values of digits of one or more Mersenne numbers represented by one or more binary numbers and a zero value as elements; and a logical product arithmetic unit obtaining a third sequence that is results of elementwise logical product operation between the first sequence and the second sequence being received from the mask generator, wherein the first sequence comprises a first subsequence; a second subsequence comprised in the second sequence indicates any of the Mersenne numbers; the third sequence comprises a third subsequence that is results of elementwise logical product operation between the first subsequence and the second subsequence; and the processes of the random number acquiring unit and the logical product arithmetic unit are executed again when the second subsequence matches the third subsequence, otherwise the logical product arithmetic unit outputs the third sequence including the random number on the factor ring.

2. A random number generation apparatus for generating a random number on a factor ring which is used for electronic cryptography system, the random number generation apparatus comprises a processing circuitry and a memory that stores a program, and when the processing circuitry executes the program, the processing circuitry is configured to implement:

a storage, a binary random number generating unit generating a first sequence that comprises values of digits of a uniform random number represented by a binary number as elements and stores the first sequence in the storage;

a random number acquiring unit obtaining, from the storage, the first sequence;

a mask generator receiving an input of Mersenne prime numbers and generating a second sequence that comprises values of digits of one or more Mersenne numbers represented by one or more binary numbers and a zero value as elements; and a logical product arithmetic unit obtaining a third sequence that is results of elementwise logical product operation between the first sequence and the second sequence being received from the mask generator, wherein the first sequence comprises a first subsequence; a second subsequence comprised in the second sequence indicates any of the Mersenne numbers; the third sequence comprises a third subsequence that is results of elementwise logical product operation between the first subsequence and the second subsequence; and the processes of the random number acquiring unit and the logical product arithmetic unit are executed again when elements of the third subsequence are constituted by zeros, otherwise the logical product arithmetic unit outputs the third sequence including the random number on the factor ring.

3. The random number generation apparatus according to claims 1 or 2, wherein the second sequence comprises the values of the digits of the plurality of Mersenne numbers.

4. A random number generation apparatus for generating a random number on a factor ring which is used for electronic cryptography system, the random number generation apparatus comprises a processing circuitry and a memory that stores a program, and when the processing circuitry executes the program, the processing circuitry is configured to implement:

a binary random number generating unit generating a first sequence that comprises values of digits of a uniform random number represented by a binary number as elements and stores the first sequence in the storage;

a random number acquiring unit obtaining, from the storage, the first sequence;

a mask generator receiving an input of Mersenne prime numbers and generating a second sequence that comprises values of digits of one or more Mersenne numbers represented by one or more binary numbers and a zero value as elements;

a logical product arithmetic unit obtaining a third sequence that is results of elementwise logical product operation between the first sequence and the second sequence being received from the mask generator; and a determiner, wherein the second sequence comprises the values of the digits of the plurality of Mersenne numbers;

the first sequence comprises a plurality of first subsequences; a plurality of second subsequences comprised in the second sequence indicate values of digits of the respective Mersenne numbers; the third sequence comprises a plurality of third subsequences; and the plurality of third subsequences are results of elementwise logical product operation between the respective first subsequences and the respective second subsequences; and the determiner obtains each of a plurality of equality determination results indicating whether or not the plurality of second subsequences match the plurality of third subsequences, respectively, by a batch determination of equality; obtains an aggregate determination result indicating whether any second subsequence and third subsequence match each other or not by a sum operation or a product operation of the plurality of equality determination results; and causes the processes of the random number acquiring unit and the logical product arithmetic unit to be executed again when the aggregate determination result indicates that any second subsequence and third subsequence match each other, otherwise the logical product arithmetic unit outputs the third sequence including the random number on the factor ring.

5. A random number generation apparatus for generating a random number on a factor ring which is used for electronic cryptography system, the random number generation apparatus comprises a processing circuitry and a memory that stores a program, and when the processing circuitry executes the program, the processing circuitry is configured to implement:

a storage;

a binary random number generating unit generating a first sequence that comprises values of digits of a uniform random number represented by a binary number as elements and stores the first sequence in the storage;

a random number acquiring unit obtaining, from the storage, the first sequence;

a mask generator receiving an input of Mersenne prime numbers and generating a second sequence that comprises values of digits of one or more Mersenne numbers represented by one or more binary numbers and a zero value as elements;

a logical product arithmetic unit obtaining a third sequence that is results of elementwise logical product operation between the first sequence and the second sequence being received from the mask generator; and a determiner, wherein the second sequence comprises the values of the digits of the plurality of Mersenne numbers;

the first sequence comprises a plurality of first subsequences; a plurality of second subsequences comprised in the second sequence indicate values of digits of the respective Mersenne numbers; the third sequence comprises a plurality of third subsequences; and the plurality of third subsequences are results of elementwise logical product operation between the respective first subsequences and the respective second subsequences; and the determiner obtains each of a plurality of equality determination results indicating whether elements of each of the plurality of third subsequences are constituted by zeros or not by a batch determination of equality; obtains an aggregate determination result indicating whether elements of any of the third subsequences are constituted by zeros or not by a sum operation or a product operation of the plurality of equality determination results; and causes the processes of the random number acquiring unit and the logical product arithmetic unit to be executed again when the aggregate determination result indicates that elements of any of the third subsequences are constituted by zeros, otherwise the logical product arithmetic unit outputs the third sequence including the random number on the factor ring.

6. The random number generation apparatus according to claims 1 or 2, wherein at least a part of the Mersenne numbers are Mersenne primes.

7. A non-transitory computer readable medium storing a program for causing a computer to function as the random number generation apparatus according to any of claims 1, 2, 4, or 5.

8. A random number generation method for generating a random number on a factor ring which is used for electronic cryptography system, the random number generation method comprises:

generating, by a binary random number generating unit, a first sequence that comprises values of digits of a uniform random number represented by a binary number as elements and stores the first sequence in a storage;

obtaining, by a random number acquiring unit, from the storage, the first sequence;

receiving, by a mask generator, an input of Mersenne prime numbers and generating a second sequence that comprises values of digits of one or more Mersenne numbers represented by one or more binary numbers and a zero value as elements; and a obtaining, by a logical product arithmetic unit, a third sequence that is results of elementwise logical product operation between the first sequence and the second sequence, wherein the first sequence comprises a first subsequence; a second subsequence comprised in the second sequence indicates any of the Mersenne numbers; the third sequence comprises a third subsequence that is results of elementwise logical product operation between the first subsequence and the second subsequence; and the processes of the random number acquiring step and the logical product arithmetic step are executed again when the second subsequence matches the third subsequence, otherwise the third sequence including the random number on the factor ring is output.

9. A random number generation method for generating a random number on a factor ring which is used for electronic cryptography system, the random number generation method comprises:

generating, by a binary random number generating unit, a first sequence that comprises values of digits of a uniform random number represented by a binary number as elements and stores the first sequence in a storage;

obtaining, by a random number acquiring unit, from the storage, the first sequence;

receiving, by a mask generator, an input of Mersenne prime numbers and generating a second sequence that comprises values of digits of one or more Mersenne numbers represented by one or more binary numbers and a zero value as elements; and obtaining, by a logical product arithmetic unit, a third sequence that is results of elementwise logical product operation between the first sequence and the second sequence, wherein the first sequence comprises a first subsequence; a second subsequence comprised in the second sequence indicates any of the Mersenne numbers; the third sequence comprises a third subsequence that is results of elementwise logical product operation between the first subsequence and the second subsequence; and the processes of the random number acquiring step and the logical product arithmetic step are executed again when elements of the third subsequence are constituted by zeros, otherwise the third sequence including the random number on the factor ring is output.

10. A random number generation method for generating a random number on a factor ring which is used for electronic cryptography system, the random number generation method comprises:

generating, by a binary random number generating unit, a first sequence that comprises values of digits of a uniform random number represented by a binary number as elements and stores the first sequence in a storage;

obtaining, by a random number acquiring unit, from the storage, the first sequence;

receiving, by a mask generator, an input of Mersenne prime numbers and generating a second sequence that comprises values of digits of one or more Mersenne numbers represented by one or more binary numbers and a zero value as elements;

obtaining, by a logical product arithmetic unit, a third sequence that is results of elementwise logical product operation between the first sequence and the second sequence; and determining, by a determiner, wherein the second sequence comprises the values of the digits of the plurality of Mersenne numbers;

the first sequence comprises a plurality of first subsequences; a plurality of second subsequences comprised in the second sequence indicate values of digits of the respective Mersenne numbers; the third sequence comprises a plurality of third subsequences; and the plurality of third subsequences are results of elementwise logical product operation between the respective first subsequences and the respective second subsequences; and the determining including:

obtaining each of a plurality of equality determination results indicating whether or not the plurality of second subsequences match the plurality of third subsequences, respectively, by a batch determination of equality;

obtaining an aggregate determination result indicating whether any second subsequence and third subsequence match each other or not by a sum operation or a product operation of the plurality of equality determination results; and causing the processes of the random number acquiring step and the logical product arithmetic step to be executed again when the aggregate determination result indicates that any second subsequence and third subsequence match each other, otherwise the third sequence including the random number on the factor ring is output.

11. A random number generation method for generating a random number on a factor ring which is used for electronic cryptography system, the random number generation method comprises:

generating, by a binary random number generating unit a first sequence that comprises values of digits of a uniform random number represented by a binary number as elements and stores the first sequence in a storage;

obtaining, by a random number acquiring unit, from the storage, the first sequence;

receiving, by a mask generator, an input of Mersenne prime numbers and generating a second sequence that comprises values of digits of one or more Mersenne numbers represented by one or more binary numbers and a zero value as elements; and obtaining, by a logical product arithmetic unit, a third sequence that is results of elementwise logical product operation between the first sequence and the second sequence; and determining, by a determiner, wherein the second sequence comprises the values of the digits of the plurality of Mersenne numbers;

the first sequence comprises a plurality of first subsequences; a plurality of second subsequences comprised in the second sequence indicate values of digits of the respective Mersenne numbers; the third sequence comprises a plurality of third subsequences; and the plurality of third subsequences are results of elementwise logical product operation between the respective first subsequences and the respective second subsequences; and the determining including:

obtaining each of a plurality of equality determination results indicating whether elements of each of the plurality of third subsequences are constituted by zeros or not by a batch determination of equality;

obtaining an aggregate determination result indicating whether elements of any of the third subsequences are constituted by zeros or not by a sum operation or a product operation of the plurality of equality determination results; and causing the processes of the random number acquiring unit and the logical product arithmetic unit to be executed again when the aggregate determination result indicates that elements of any of the third subsequences are constituted by zeros, otherwise the third sequence including the random number on the factor ring is output.

* * * * *